(12) United States Patent
Orini

(10) Patent No.: US 8,686,290 B2
(45) Date of Patent: Apr. 1, 2014

(54) SUBMARINE ELECTRIC POWER TRANSMISSION CABLE ARMOUR TRANSITION

(75) Inventor: Ambrogio Orini, Milan (IT)

(73) Assignee: Prysmian S.p.A., Milan (IT)

( * ) Notice: Subject to any disclaimer, the term of this patent is extended or adjusted under 35 U.S.C. 154(b) by 183 days.

(21) Appl. No.: 13/142,312

(22) PCT Filed: Dec. 29, 2008

(86) PCT No.: PCT/EP2008/068316
§ 371 (c)(1),
(2), (4) Date: Oct. 18, 2011

(87) PCT Pub. No.: WO2010/075873
PCT Pub. Date: Jul. 8, 2010

(65) Prior Publication Data
US 2012/0024565 A1    Feb. 2, 2012

(51) Int. Cl.
H01B 7/18    (2006.01)
H01B 9/02    (2006.01)
H02G 3/04    (2006.01)

(52) U.S. Cl.
USPC ........... 174/102 R; 174/106 R; 174/105 B; 174/68.1

(58) Field of Classification Search
USPC ........... 174/102 R, 106 R, 105 B, 68.1, 68.3, 174/70 C, 109, 15.1, 15.2, 15.3, 21 R, 21 JS, 174/21 C, 24, 32, 34, 75 R, 91, 92, 103, 174/105 R
See application file for complete search history.

(56) References Cited

U.S. PATENT DOCUMENTS

| 1,762,956 | A | * | 6/1930 | Buckley | 178/45 |
| 2,873,307 | A | * | 2/1959 | Horn | 174/102 R |
| 3,634,607 | A | * | 1/1972 | Coleman | 174/120 R |
| 3,874,960 | A | * | 4/1975 | Matsuzaki et al. | 156/49 |
| 3,925,598 | A | * | 12/1975 | Suzuki et al. | 174/108 |
| 4,644,097 | A | * | 2/1987 | Johnsen et al. | 174/102 R |
| 4,874,909 | A | * | 10/1989 | Velke et al. | 174/84 S |
| 6,567,591 | B2 | * | 5/2003 | Hoch | 385/107 |
| 6,747,213 | B2 | | 6/2004 | Bonicel | |
| 7,230,180 | B2 | * | 6/2007 | Frank | 174/36 |
| 2001/0016103 | A1 | | 8/2001 | Hoch | |

FOREIGN PATENT DOCUMENTS

| GB | 244478 | 7/1926 |
| JP | 14405 | 11/1931 |
| JP | 2004-350837 | 12/2004 |
| WO | WO 2008-065830 | 6/2008 |

OTHER PUBLICATIONS

International Search Report from the European Patent Office for International Application No. PCT/EP2008/068316 (Mail date Aug. 4, 2009).

* cited by examiner

*Primary Examiner* — Hoa C Nguyen
*Assistant Examiner* — Ahmad D Barnes
(74) *Attorney, Agent, or Firm* — Finnegan, Henderson, Farabow, Garrett & Dunner, L.L.P.

(57) ABSTRACT

An electric power transmission cable includes at least one first section provided with cable armor made of a first metallic material, and at least one second section provided with a cable armor made of a second metallic material, wherein the second metallic material has ferromagnetic properties substantially lower than those of the first metallic material.

13 Claims, 2 Drawing Sheets

SUBMARINE ELECTRIC POWER TRANSMISSION CABLE ARMOUR TRANSITION

CROSS REFERENCE TO RELATED APPLICATION

This application is a national phase application based on PCT/EP2008/068316, filed Dec. 29, 2008, the content of which is incorporated herein by reference.

BACKGROUND OF THE INVENTION

1. Field of the Invention

The present invention generally relates to the field of electric cables, i.e. cables for electric power transmission, in particular, alternate current (AC) power transmission, more particularly to submarine electric cables substantially intended to be deployed underwater.

2. Description of the Related Art

A typical submarine cable for AC power transmission in the medium voltage (MV) and high voltage (HV) ranges (less than approximately 50 KV for MV, higher than 50 KV for HV) comprises one or more conductors (one conductor for single-phase power transmission, three conductors for 3-phases power transmission; cables with more than one conductor are also referred to as "multi-core" cables). Each conductor is surrounded by a conductor screen, an insulation structure typically comprising an insulation layer and an insulation screen, a water barrier layer, a metallic screen or sheath, and optionally a plastic sheath. In multi-core constructions, the core conductors are bundled, with the hollow space being filled with fillers and surrounded by a bedding made of tapes or yarns and possibly by a plastic sheath. An armour of metal wires or tapes is usually circumferentially provided over the bedding. In some applications, the armour may be covered by a polymeric sheath, or by one or more layers of yarns. A thin polymeric sheath can also be applied on each individual armour wire.

The armour is a structural reinforcing part having the function of strengthening the mechanical characteristics and performance of the cable during handling and installation thereof, as well as to provide resistance against external damage. The use of metal in the armour is particularly advisable in submarine cables due to the compressive forces eventually exerted thereon, which may be a problem for non-metallic armours.

Typically, the armour is made of one or two layers of wires, round or flat in shape, made of steel with low to medium carbon content (for example ranging from less than 0.015% to up to 2%). Steel is generally used due to its low cost, availability of supply and good mechanical properties. Other materials used for the cable armour can be galvanized (e.g. zinc-coated) steel, copper, brass, bronze. Galvanized steel is preferably used when the armour wires are exposed to the environment without any polymeric sheath or yarn layer, to ensure better resistance to corrosion.

In use, submarine cables are generally installed under water, typically buried under the bottom ground, but portions thereof may be laid in different environment; this is, for example, the case of shore ends of submarine links, intermediate islands crossing, contiguous land portions, edge of canals and similar situations. One critical aspect of these environments is often a worse thermal characteristics and/or higher temperature with respect to the situation in the offshore main route.

An important parameter of an electric cable is the current rating, i.e. the amount of current that the cable can safely carry continuously or in accordance to a given load scenario. If the current rating is exceeded for a length of time, the increase in temperature caused by the generated heat may damage the conductor insulation and cause permanent deterioration of electrical or mechanical properties of the cable. The current rating of a cable is used to determine the proper cable core size for a given load, or current drain. Factors influencing the current rating of a cable are the cable core size, the operational system parameters of the electric power distribution circuit, the type of insulation and materials used for all cable components and the installation condition and thermal characteristics of the surrounding environment.

In an AC power cable, the magnetic field generated by the current flowing in the conductor/s induces losses in ferromagnetic materials, such as low to medium carbon-containing steel used as armour wires. As "ferromagnetic material" is meant a material having high magnetic permeability, i.e. a material capable of concentrating magnetic flux by a factor of more than 10. The magnetic hysteresis is the lagging of changes in the magnetization of a substance caused changes in the magnetic field as the magnetic field is varied. The magnetic domains of the ferromagnetic material rotate with the magnetic field in alternate current cable. This rotation of magnetic domains in the material causes friction and heat. The heat produced by this friction is called magnetic hysteresis loss. Such an induced heat, added to that produced by the conductor/s due to the current transport, can hinder the overall current carrying capacity of the cable, especially when the cable is deployed in environment with low or null heat dissipation capability.

The magnetic hysteresis losses can amount up to 20% or more of the overall loss suffered by an AC cable in operation, depending on the material and size of the armour.

Another phenomenon possibly affecting the current rating of a cable is that of the eddy currents. In an AC cable eddy currents are induced in conductive material, such as the metal of the cable armour. Eddy currents cause energy to be lost in form of heat that, as already said above in connection with magnetic hysteresis loss, can hinder the overall cable current carrying capacity.

The eddy current losses can amount at about 2% of the overall loss suffered by an AC cable in operation.

In the case of submarine cables, the above-mentioned problem is particularly important in cable sections laid in zones different from that of the underwater bottom ground, said zones being characterized, for example, by higher external temperature and/or soil thermal resistivity and/or deeper cable burial depth, these conditions affecting the ability of the cable to dissipate heat.

U.S. Pat. No. 4,644,097 relates to an armored submarine cable. In particular, the cable is provided with a core containing conductors and a layer of armoring disposed on the outside of and surrounding the core, the layer including at least one section of heavy armor including at least one layer of heavy metal wires having ends in order that the cable may withstand mechanical forces applied thereto, at least one section of lightweight armor having ends, and a transition region in which the armor section and the lightweight armor section are joined in a manner such that the stiffness and flexibility of the cable are controlled. In particular, the cable has a metal wire armor in the shallow water sections and light weight non-metallic armor in the deep water section. The transitions between the shallow and deep water sections of the cable are made so as to obtain a gradual and controlled change in the flexibility of the cable. The end portions of the armor wires and elements should preferably be treated with mechanical and/or chemical means so as to increase the surface areas before applying a synthetic jointing material. The jointing material which preferably could be an epoxy resin may be applied by pressure molding or by other means.

No mention is made about specific materials to be used as heavy armour section or lightweight armour section, and no hint is provided about the characteristics thereof. The lightweight section can be non-metallic; in such case U.S. Pat. No. 4,644,097 teaches to position such section in the deep water where the losses problem of the present invention not severely affect the current rating capability of the cable.

U.S. Pat. No. 6,567,591 relates to a submarine cable with a length of armouring that surrounds the cable core and has armouring wires which are replaced in at least some portions in the longitudinal direction of the armouring by filler strands manufactured of a material having a lighter and a lower tensile strength than the armouring. The armouring wires are composed, for example, of steel, special steel, especially stainless steel, or aluminium. Filler strands formed from plastic meet these requirements. These may be non-reinforced thermoplastics or reinforced plastics, especially fiber-reinforced plastics, for example glass fiber-reinforced plastics. Such filler strands are lighter than the armouring wires, so that the weight of the submarine cable can be reduced by adapting the armouring to the prevailing pressure conditions. The cable armour has armouring of differing load-bearing capacity along its length.

The cable has armouring sections differing from the mechanical point of view, but this document is silent about environmental conditions possibly haring the current carrying capability of the cable.

U.S. Pat. No. 3,925,598 discloses an armored submarine cable including a cable core centrally of the cable and a plurality of armor wires extending substantially longitudinally of the cable around the core and spaced apart therefrom. Each of the armor wires comprises a plurality of lengthwise successively aligned sections of anticorrosive metal wires and an electric insulation means between each adjacent two of said sections of the metal wires.

Each of the armour wire modified according to U.S. Pat. No. 3,925,598 still suffers from magnetic hysteresis and eddy current losses.

U.S. Pat. No. 6,747,213 relates to a power transport cable structurally reinforced by incorporating at least one reinforcing wire or armoring having one or more layers of wires. In particular, the cable has at least one reinforcing or armoring wire made of composite steel having a steel core of standard type, and covered in a layer of stainless steel.

The above described cable armour has no changing in the longitudinal direction. A corrosion problem is solved, but the magnetic hysteresis losses are still present, due to the presence of a steel core of the standard type. The overall cost of the cable is increased.

The Applicant observes that although the problem of avoiding a reduction in the electrical power transport capability of an electric cable due to heat generated by losses in the cable armour might be solved by increasing the size of the cable, or of portions thereof, particularly of those cable sections which, in use, lay in the above-mentioned unfavourable conditions, such a solution is not satisfactory since it implies heavier and more expensive cables in the first case, or the installation of transition joints between cable sections of different cable sizes in the latter case. Also, having a cable made up of distinct sections of different size is not desirable, because the cable continuity is impaired which is detrimental for the cable mechanical resistance and thus requires careful handling during laying operation.

Another possibility to reduce the losses in the cable armour could be using a different material for the armour, particularly using a non-ferromagnetic metal like copper, bronze, brass, or stainless steel. Nevertheless, the use of these materials for making the whole cable armour significantly increases the cost of the cable; in some instances, the quantity of these materials could be minimised by using plastic spacers among wires, in order to reduce the costs, but in this case the mechanical resistance/protection of the cable would be reduced.

The Applicant has tackled the problem of how to avoid that the current transport capability of an electric cable be hampered by losses in the cable armour in some specific sections of the cable system route.

The Applicant has observed that, from an overall system point of view, it is in general not necessary that the current rating of the cable is increased throughout the whole cable system route, being sufficient to achieve this only in particular sections along the cable route where different and more critical environmental and installation conditions are present and cannot be avoided, like for example, but not limited to, higher outside temperature and/or soil thermal resistivity and/or deeper cable burial depth, or installation of the cable within ducts, presence of air gaps, presence of heat sources in proximity of the cable, and any other cause that could reduce the current rating of the cable in specific sections along the cable route.

The Applicant has found a solution that is effective in overcoming the above-mentioned problem, in a way that neither excessively increases the costs of the electric cables nor makes the handling and installation operations of the cables more critical.

SUMMARY OF THE INVENTION

The Applicant considered a solution wherein a submarine cable comprises at least one section endowed with armour tailored for limiting or even avoiding the current losses affecting the cable current rating in zone characterized by challenging thermal conditions. In particular, the solution provides for a submarine cable comprising sections differing from one another in the metallic material of the armour only, the section to be laid in zones challenging the current rating thereof being endowed with armour system essentially consisting of elements made of a metallic material essentially free from ferromagnetism, e.g., a non-ferromagnetic metallic material, while in the remaining sections of the cables, where the current rating can be accomplished with standard cable armour, the armour is based on e.g. carbon steel.

While the armour material changes from one cable section to another, the cable structure remains the same (i.e. the transition from a section to another affects the cable armour material only) thus giving the system uniformity in mechanical and handling characteristics and avoiding mechanical and electric problems associated with the connection of two conductors and to the reconstruction of the electrical insulation associated thereto. The sections of the cable of the invention substantially constitute a continuum in the cable structures such as conductor/s, insulation layers and sheaths, the transition between sections involving the armour elements only.

The Applicant also observed that the contact between the non-ferromagnetic metallic material of one section and the conventional metallic material of another section in a transition can give rise to electrochemical corrosion phenomena, mainly of the conventional metallic material.

Therefore, in a preferred embodiment, the present invention provides for an anticorrosion material at the transition sections between non-ferromagnetic metallic material armour and conventional metallic material armour, said material being selected from insulating polymer and, preferably, zinc. The zinc can be in form of rods, wires, strips or enamel.

Advantageously, the anticorrosion material is distributed for a length of from 1 m to 20 m from the contact point between the two armouring materials, preferably from 5 m to 10 m, at least in one direction, preferably in the direction of the conventional metallic armour of the first section armouring elements. The length of the anticorrosion material along the armour elements can be the same or different in the two directions starting from the contact point between the two armouring materials.

According to an aspect of the present invention, an electric power transmission cable is provided, comprising:
- at least one first section provided with armour elements made of a first metallic material, and
- at least one second section provided with armour elements made of a second metallic material, wherein the second metallic material has ferromagnetic properties substantially lower than those of the first metallic material, said sections being longitudinally contiguous to each other The first metallic material is ferromagnetic, for example a steel of the standard type, for example carbon steel.

The second metallic material may be selected in the group consisting of stainless steel, particularly austenitic stainless steels, copper, brass, bronze or composites or alloys thereof. Advantageously, the second metallic material is a stainless steel.

Advantageously, the second metallic material has electrical conductivity lower than that of the first metallic material.

The armour elements in the first and second cable sections are preferably, a plurality of elongated armour elements.

The armour elements in the first section may be butt-welded to corresponding armour elements in the second section.

The armour elements in the first section may be joined to corresponding armour elements in the second section by means of ferrules or screws.

The armour elements in the first section and the armour elements in the second section may be respectively welded to a metallic material sleeve provided on the cable.

The armour elements in the first section and the armour elements in the second section may be wrapped onto one another and overlap one another.

The cable of the present invention advantageously has at least one conductor—and the relevant insulation—which is continuous in correspondence of the transition between first and second section.

Advantageously, the cable of the invention comprises a plurality of conductors, preferably three conductors.

An anticorrosion protection is preferably provided in correspondence of a transition from a first section cable to a second section.

The anticorrosion protection may comprise zinc rods or strips inserted in between the armour elements.

The anticorrosion protection preferably extends for a length of about from 1 m to 20 m at least in one direction, preferably in each direction from the contact point between the two armour elements metallic materials, preferably of from 5 m to 10 m at least in the direction of the conventional metallic armour, i.e. that of the first cable armouring elements.

The extension of the anticorrosion protection of the invention in one of the direction can be of substantially the same or different length of the extension in other direction.

Said elongated armour elements may be round wires, and the zinc rods may be of round shape and have a diameter in the range of 40÷60% of that of the armour elements, respectively for large and small wires diameter.

BRIEF DESCRIPTION OF THE DRAWINGS

Further details of the invention will be illustrated in the following description, with reference to the appended figures, wherein.

DETAILED DESCRIPTION OF EXEMPLARY EMBODIMENTS OF THE INVENTION

Figure 1:
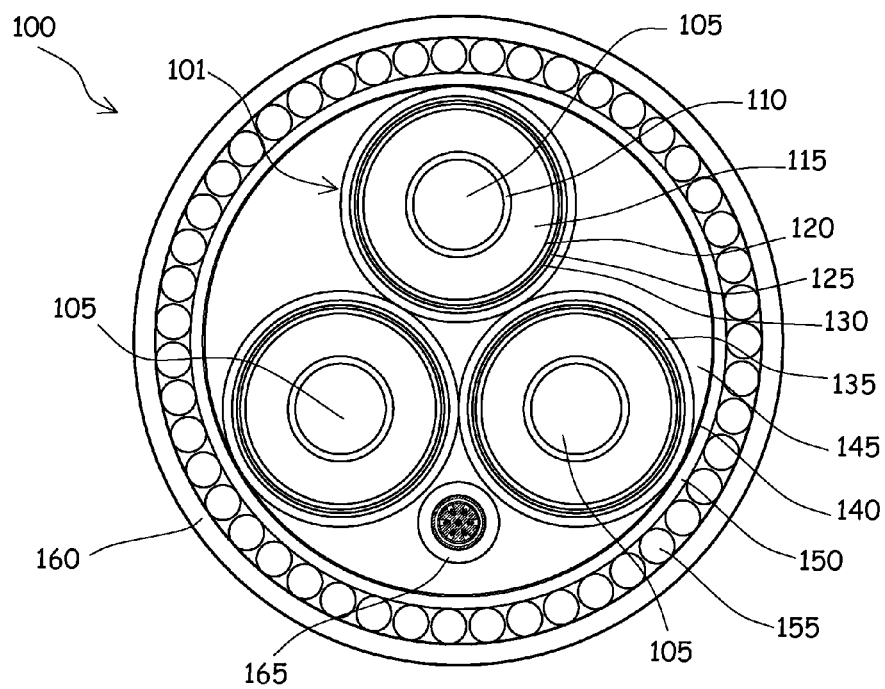
FIG. 1 schematically shows in cross-section the structure of an electrical cable.

Making reference to the drawings, in FIG. 1 there is schematically shown a cross-sectional view of an electrical cable 100, particularly a submarine cable for AC electrical power transmission in the MV or HV ranges.

The cable 100 is a multi-core cable adapted to 3-phases power transmission; the number of cores 101 in the cable is not a limitation for the present invention. Preferably, the invention applies to multi-core cables with any number of cores 101, but can advantageously be applied to a single core cable, too.

In the structure shown by FIG. 1, the cable 100 is a multi-core cable comprising three cores 101, each comprising a conductor 105, surrounded by a conductor screen 110, an insulation typically comprising an insulating layer 115 and an insulation screen 120, a water barrier layer 125, a metallic screen 130 and, optionally a polymeric sheath 135.

The insulating layer 115 may be an extruded insulating layer, for example made of cross-linked polyethylene, or an insulating layer made, for example, of paper or polypropylene-paper laminate tapes mass-impregnated with a filling compound.

In case the insulating layer 115 is extruded, the conductor screen 110 and the insulation screen 120 are usually made of a semi-conductive extruded material. In case the insulating layer 115 is based on mass-impregnated tapes, the conductor screen 110 and the insulation screen 120 may be made of tapes as well.

The water barrier layer 125 can be made of textile suitably impregnated with water-expandable powder.

The cores 101 are stranded together and, possibly, wrapped by a binder tape 140, is provided with a bedding layer 150. The resulting hollow space is filled with fillers 145. For example, as fillers 145 polypropylene yarns or raffia-like strands can be employed. These materials allow filling the hollow space without adding excessive weight to the cable.

An armour of metallic material wires 155 surrounds the bedding layer 150. The armour is finally surrounded by a layer 160 of yarns or by a plastic, polymeric sheath.

Optionally, an optical cable 165 may be accommodated in the core interstices within the bedding layer 145.

As discussed in the foregoing, the power transmission capability of an AC electrical cable is determined by the particular environmental conditions and cable laying requirements.

For example, let the case be considered of a cable having the typical design of FIG. 1, with the following basic characteristics:

- rated system transmission voltage U=132 kV (Um=145 kV);
- conductors size (for each phase) 800 mm$^2$;
- cross linked polyethylene insulation (XLPE);
- lead sheath and plastic sheath over each core conductor;
- armour wires in galvanised steel of 6 mm diameter.

Let it be assumed that the cable is used to connect the mainland to an island, crossing a 15 km long offshore portion in open sea at a burial depth under the sea bottom of 1.4 m, with a soil thermal resistivity of 0.8 K*m/W and an ambient (water and soil) temperature of 20° C. The cable, in these installation conditions, is capable to carry the required continuous (100 load factor) current, assumed to be of 800 A.

Let it be supposed now that the cable has to cross short portions on the shores (e.g. 500 m long, at one or both ends of the offshore portion) to be connected with a land cable and/or a cable termination, and that in correspondence of such zones the cable is buried deeper below the sea or ground surface, e.g. at a depth of 8 m. The increase of burial depth is required for instance because of the need of pulling the cable inside an HDD (Horizontal Directional Drilling) pipe or because of shores higher in level with respect to the sea level.

Figure 2:
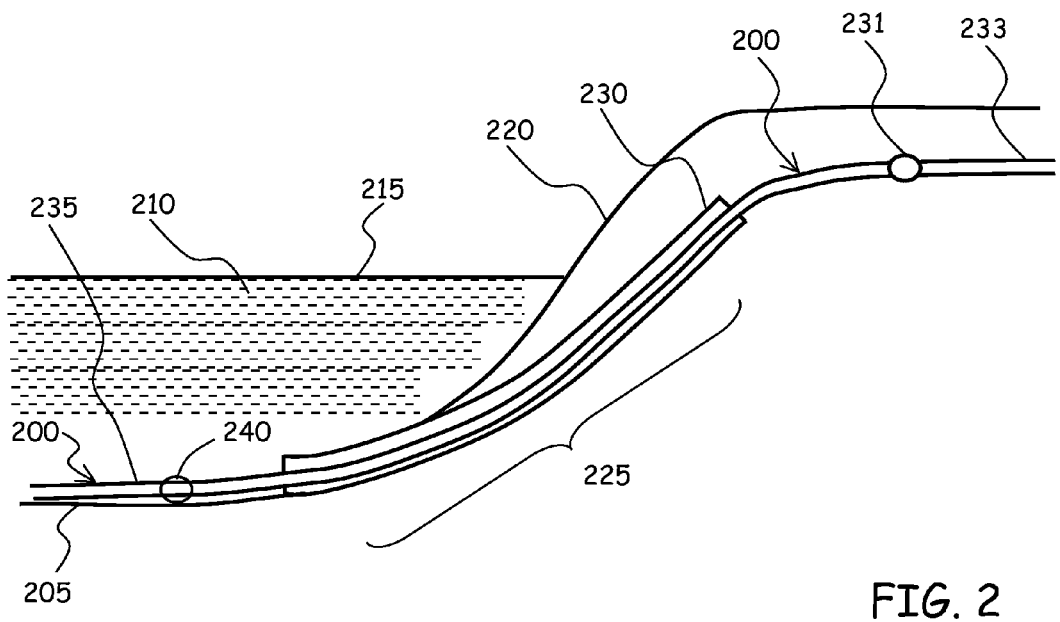
FIG. 2 pictorially shows an installed cable according to an embodiment of the present invention.

The above described installation scenario is schematically depicted in FIG. 2.

Even assuming that the ambient temperature in the shore portion is as low as 10° C. and that the ground has a similar thermal resistivity as the sea bottom, the fact that the cable is buried more deeply—thus less readily dissipating the heat generated by cable losses—implies that the cable conductors size should be increased to 1200 mm$^2$ to keep ensuring a current flow of 800 A along the entire route in order not to face an unacceptable increase of cable temperature in the shore portion. In such case the overall cost of the cable would greatly increase because of manufacturing and installing 15 Km of cable with conductors of 1200 mm$^2$ instead of 800 mm$^2$ involves a significant extra cost.

On the other hand, the unfavourable conditions are encountered in only 500 m of the cable length.

Using two different cable sections connected in series, one of larger size (conductors of 1200 mm$^2$) only close to the shores where the unfavourable conditions are encountered, and another one of smaller size (conductors of 800 mm$^2$) in the offshore portion, would require the installation of transition joints between the different cables, to connect the cables with different conductor sizes. The transition joints can be applied in the factory, but in this case the handling and installation of the cable would be more critical, because of the need of handling a bulky transition joint during the cable laying process. In alternative, the transition joints can be applied during the cable installation operations, but this would make the installation more complicated, and consequently the installation would be more expensive because of the need of assembling the joint in the filed. The jointing procedure is even more complicated in the presence of an optical cable comprised within the power cable structure.

Another possibility would be to use the 800 mm$^2$ cable for the whole all route and install a forced cooling system for the shore portions only, in order to improve the dispersion of heat by using external means; this however involves an increase in the overall costs of the connection and requires supervision systems and maintenance.

According to an embodiment of the present invention, as schematically depicted In FIG. 2, a cable 200 comprises a section 235 laid on the bottom 205 of the sea or of a lake 210, under the water surface 215 (possibly, the section 235 is slightly buried under the sea bottom, at a depth of about 1 m).

In correspondence of the sea shore 220 or of an end cliff of the sea or lake, a section 225 of the system 200 is buried, being preferably inserted in a pipe or duct 230; the section 225 is joined through a joint 231 to a land cable 233.

The section 225 of the cable 200 experiences environmental conditions that are less favourable, from the temperature and heat dissipation viewpoint, than the cable 235 immersed in water or buried under the sea or lake bottom, like in the drawing.

According to an embodiment of the present invention, the section 235 of the cable 200 which, in use, is located under the water surface 215 and are thus immersed in water has an armour made of a metallic material conventionally employed in the art for that purpose, for example carbon steel, which is an electrically conductive and ferromagnetic material. The section 225 located in less favourable conditions, from the viewpoint of the ambient temperature and heat dissipation, has an armour made of a material of essentially non-ferromagnetic. In a preferred embodiment the material of the armour of section 225 has low electric conductivity.

In other words, according to an embodiment of the present invention, the cable 200 comprises at least one first section, in the example the section 235, and at least one second section, in the example the section 225. The first section 235 has the armour made of one of a conventional metallic material, such as, for example, carbon steel, which is relatively cheap, highly available, and ensures the desired strength. The second section 225 has the armour made of essentially non-ferromagnetic and preferably low electric conductivity metallic material, so as to reduce the losses and the consequently generated excess heat.

It can be appreciated that only the cable sections which, after deployment, are expected to face unfavourable conditions from the ambient temperature and/or heat dissipation viewpoint, are manufactured with an armour made of a material selected to be essentially non-ferromagnetic; this allows reducing the cable losses and the consequent rise in temperature of the cable in that cable section or sections. All the remaining cable length, not having to cope with the problem of temperature rise, can have armour made of conventional material, like carbon steel. All of the sections of the cable 200 can have the same structure and, in particular, are essentially continuous in terms of conductors and insulation thereof, so that no complex transitions are required. The change consists only in the use, for the sections having to cope with more severe thermal conditions, of a different, non-ferromagnetic, preferably low electrically conductive material for the armour that allows keeping to the cable current rating without changing the basic design of the cable live parts.

The transition between one first section and an adjacent second section does not modify the cable system longitudinal continuity, even if the materials of the armour are different.

This solution is advantageous under several viewpoints. It allows overcoming the problem of reduction of the current transport capability of the cable in a relatively cheap way, because the sections to be realized with the armour of different, more expensive material are usually short compared to the overall cable length. The remaining section/s of the system can remain unchanged, it is not necessary to increase the conductor size neither for the whole cable length, which would greatly increase the cable cost, nor for sections thereof, which would require the provision of joints for joining the cable sections of different size, with the consequent problems in cable handling and installation.

The transition (indicated with 240 in FIG. 2) between section 235 (with armour made in conventional metallic material) and section 225 (with armour made in a non-ferromagnetic material) is preferably factory-made.

In general, the transition between two sections having armour in different materials can be accomplished in several ways.

Figure 3:
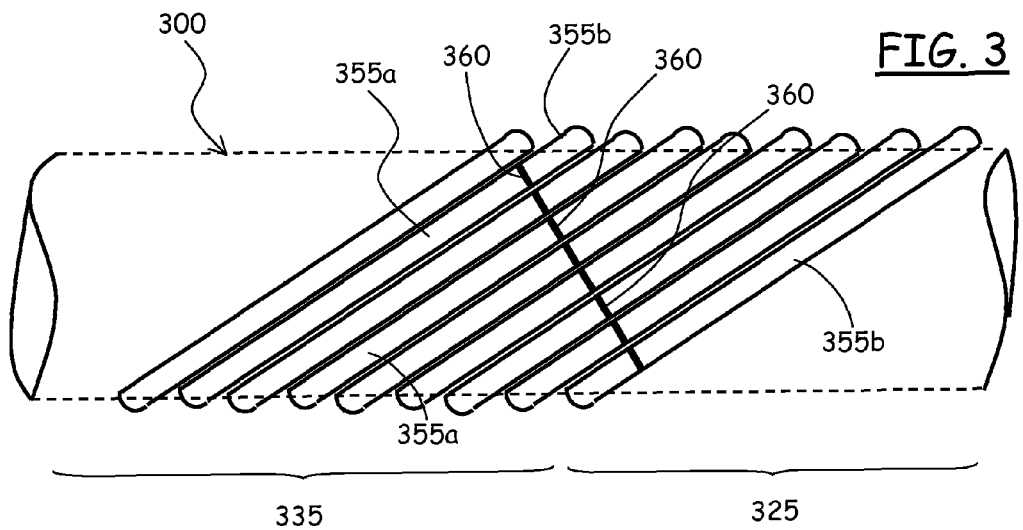
FIG. 3 schematically shows a segment of the cable of FIG. 2 wherein, according to an embodiment of the present invention, a transition between sections of the cable armour in different material is present.

For example, as shown in FIG. 3 schematically depicting a portion of cable 300 wherein, according to an embodiment of the present invention, the wires 355a, made of one of the typical metallic materials exploited in the art for that purpose, like for example carbon steel, that make up the armour structure of a first section 335 of the cable 300, may be butt-welded at 360 to the corresponding wires 355b, made of essentially non-ferromagnetic, and preferably low electric conductivity metallic material, that make up the armour of a second section 325 of the cable 300. The wires 355a and 355b making up the armour in the two sections 335 and 325 are of substantially equal, preferably at least similar or comparable dimensions. More than one wire may be welded at a time. This solution has the advantage of avoiding any discontinuity in the cable.

Other techniques for accomplishing the transition between two sections having the armour made of different materials include for example the use of ferrules or screws to connect each armour wire of a first metallic material to the respective armour wire made of a second metallic material. The wires making up the armour in one section may also overlap and optionally be wrapped onto the wires making up the armour of the adjacent section, in different material, for example for a length of approximately one or some stranding pitches of the armour wires.

Figure 4:
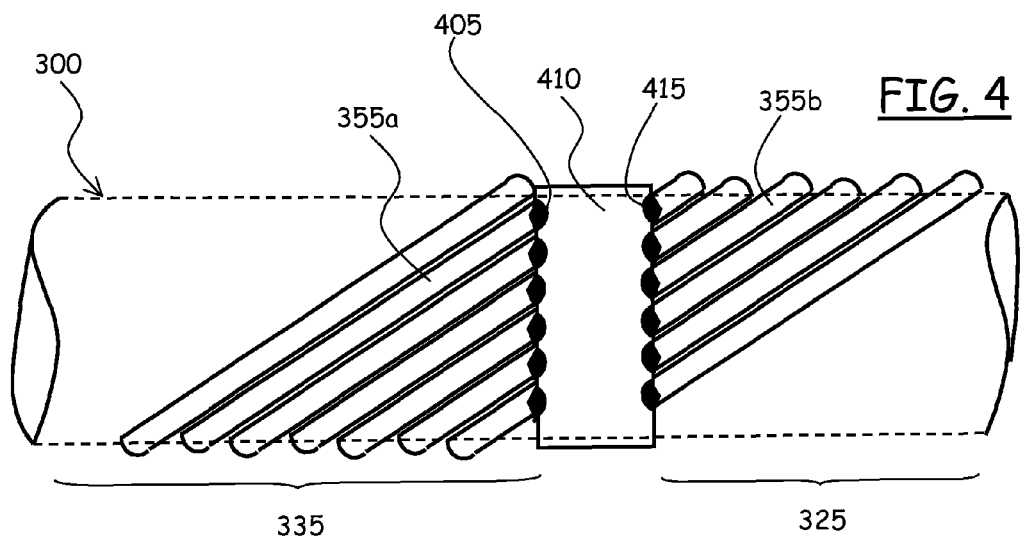
FIG. 4 schematically shows the cable segment of FIG. 3, with an alternative way of accomplishing the transition between the cable armour in different materials.

The transition between two cable sections having the armour made of different materials may also be accomplished by clamping or welding the armour wires to a common metal belt, as schematically depicted in FIG. 4, wherein the ends of the wires 355a, made of one of the typical metallic materials exploited in the art for that purpose, like for example carbon steel, that make up the armour structure of the first section 335 of the cable 300, are welded at their ends 405 to a metal sleeve or belt 410 positioned around the cable structures in a radial internal position with respect to the cable armour; in turn, the wires 355b, made of essentially non-ferromagnetic that make up the armour of the second section 325 of the cable 300, are welded to the metal belt 410 at their ends 415. The metal belt 415 may be formed by two separate metal half-rings welded to one another in order to ease the insertion of the metal belt 405 onto the cable; also, the metal belt 405 may be formed of two or more segments.

The Applicant found that a suitable material for making the armour of a cable section which, in use, encounters unfavourable conditions is stainless steel; stainless steel is non-ferromagnetic and much less conductive than carbon steel, so that its use, in place of carbon steel, allows highly reducing the induced losses in the armour and thus locally improves the power transmission capability of the cable.

Particularly preferred materials are the so called austenitic stainless steels. Such stainless steels contain a maximum of 0.15% carbon, a minimum of 16% chromium and sufficient nickel and/or manganese and/or molybdenum in all range of temperatures. For example, a typical composition of 19% chromium 11% nickel and 2% molybdenum is commonly known as AISI 316 stainless.

Other non-ferromagnetic materials that can used are, e.g. copper, brass, bronze.

In use, the portion(s) of the cable where the transition between two sections having armour made of different materials is present may be subject to corrosion. Due to the presence of different metallic materials, corrosion in the less-noble material (e.g., carbon steel if compared to stainless steel) may take place in more or less long period of times.

According to embodiments of the present invention, one or more of the following measures (anticorrosion protection) can be adopted to avoid or at least reduce corrosion at the transition between armour comprising different material according to the invention.

Longitudinally zinc rods or strips may be inserted in between the armour wires, both in conventional and non-ferromagnetic metallic material, preferably extending for a length of about from 1 m to 20 m from the contact point between the two armouring materials, preferably of about 5 m to 10 m at least in one direction, where the less noble, and thus more subject to corrosion metallic material is present (carbon steel, for example), preferably at each side of the armour material transition. The length of the anticorrosion protection from the contact point between the two armouring materials can be different in the adjacent sections.

To make effective the cathodic protection provided by the zinc rods or strips, these should be in intimate contact or welded at least in one point to the armour wires of the less noble material, e.g. those in carbon steel. The zinc rods or strips should be significantly thicker than the zinc coating provided on the galvanised steel wires. In an embodiment, for round armour wires the zinc rods may be of round shape and have, for example, a diameter in the range of 40÷60% of that of the armour wires (respectively for large and small wires diameter).

Figure 5:
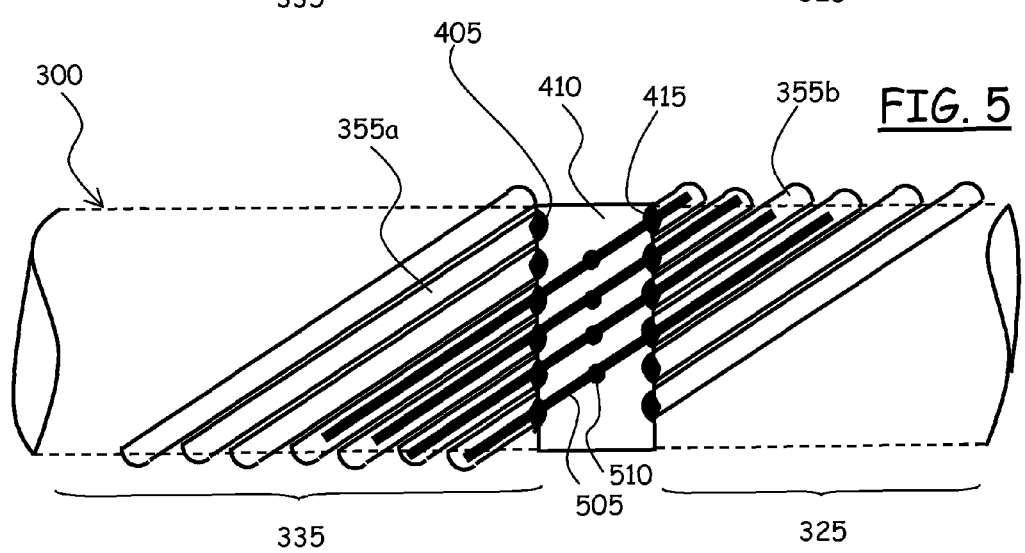
FIG. 5 schematically shows the cable segment of FIG. 3, with an anti-corrosion arrangement at the transition between the cable armour in different materials.

For example, as depicted in FIG. 5, zinc rods or strips 505 may be welded at 510 to the metal belt 415.

Another possible anticorrosion protection may provide for continuously wrapping zinc wires, flat strips or portions of a zinc tape with tight winding around the armour, like a spring, for example for a length of about 5 m at each side of the armour material transition. The zinc wires, flat strips or zinc tape portions should be in intimate contact with or welded to the armour wires.

Enamels zinc based compound could be applied at the transition area to increase zinc content and improve contact between zinc elements and armour.

As an alternative to the use of zinc wires, the armour material transition region may also be fully insulated, by filling all the armour wires transition section with insulating resin and protecting it by heat-shrinkable plastic sheathes or tight impermeable plastic taping. This can be also obtained by insulating the single elementary armour wire transitions. This solution is regarded as the preferred one in case the armour wires are already required to be singularly covered by plastic thin sheathes throughout all the cable length, i.e. both in the offshore and shore portions; in this case, no additional zinc material is needed. However this solution may be not recommended in case of use of bare armour wires, due to the tendency of the stainless steel to crevice corrosion.

Zinc can be replaced by materials with similar cathodic protection characteristics, e.g. zinc-alloys.

The previous description presents and discusses in detail several embodiments of the present invention; nevertheless, several changes to the described embodiments, as well as different invention embodiments are possible, without departing from the scope defined by the appended claims.

For example, the armour may be made up of flat stripes, instead of round wires.

While any of the above mentioned non-ferromagnetic materials can be used, stainless steel is preferred over other non-ferromagnetic material because welding and connecting solutions in general to the conventional metallic material armour wires is less critical. Also, stainless steel eases the anticorrosion protection, in terms of effectiveness and length/extension of the anticorrosion protection (lower than that required by for example copper).

The invention claimed is:

1. An electric power transmission cable comprising: at least one first section provided with cable armour elements made of a first metallic material, and at least one second section provided with cable armour elements made of a second metallic material, wherein the second metallic material is substantially free from ferromagnetism, said first and second sections being longitudinally contiguous with each other;
wherein an anticorrosion protection is provided in correspondence with a contact point between the armour elements in the first section and the armour elements in the second section;
wherein the anticorrosion protection comprises zinc rods or strips inserted in between the armour elements in the first section and the armour elements in the second section.

2. The electric power transmission cable of claim 1, wherein the second metallic material is selected from stainless steel, copper, brass, bronze and composites and alloys thereof.

3. The electric power transmission cable of claim 2, wherein the second metallic material is a stainless steel selected from austenitic stainless steels.

4. The electric power transmission cable of claim 1, wherein the second metallic material has electric conductivity lower than the electrical conductivity of the first metallic material.

5. The electric power transmission cable of claim 1, wherein the armour elements in the first section are butt-welded to corresponding armour elements in the second section.

6. The electric power transmission cable of claim 1, wherein the armour elements in the first section are joined to corresponding armour elements in the second section by means of ferrules or screws.

7. The electric power transmission cable system of claim 1, wherein the armour elements in the first section and the armour elements in the second section are respectively welded to a metal belt.

8. The electric power transmission cable of claim 1, wherein the armour elements in the first section and the armour elements in the second section are wrapped onto one another and overlap one another.

9. The electric power transmission cable of claim 1, wherein the anticorrosion protection extends for a length of 1 m to 20 m in at least one direction from the contact point between the armour elements in the first section and the armour elements in the second section.

10. The electric power transmission cable of claim 9, wherein the anticorrosion protection extends for a length of 5 m to 10 m from the contact point between the armour elements in the first section and the armour elements in the second section.

11. The electric power transmission cable of claim 9, wherein the anticorrosion protection extends from the contact point between the armour elements in the first section and the armour elements in the second section at least in a direction of the armour elements in the first section.

12. The electric power transmission cable of claim 9, wherein the anticorrosion protection extends from the contact point between the armour elements in the first section and the armour elements in the second section for lengths different or substantially equal.

13. The electric power transmission cable of claim 1, wherein the zinc rods are round with a diameter of 40% to 60% of the diameter of the armour elements.

* * * * *